US012685335B2

(12) United States Patent
Jung et al.

(10) Patent No.: US 12,685,335 B2
(45) Date of Patent: Jul. 21, 2026

(54) METHOD OF GENERATING AEROSOL USING ULTRASONIC VIBRATOR AND ELECTRONIC DEVICE FOR PERFORMING THE METHOD

(71) Applicant: KT&G CORPORATION, Daejeon (KR)

(72) Inventors: Jinchul Jung, Daejeon (KR); Gyung Min Go, Daejeon (KR); Jangwon Seo, Daejeon (KR); Chul Ho Jang, Bucheon-si (KR)

(73) Assignee: KT&G Corporation, Daejeon (KR)

( * ) Notice: Subject to any disclaimer, the term of this patent is extended or adjusted under 35 U.S.C. 154(b) by 377 days.

(21) Appl. No.: 18/564,405

(22) PCT Filed: Jun. 20, 2023

(86) PCT No.: PCT/KR2023/008527
§ 371 (c)(1),
(2) Date: Nov. 27, 2023

(87) PCT Pub. No.: WO2023/249371
PCT Pub. Date: Dec. 28, 2023

(65) Prior Publication Data

US 2025/0072490 A1 Mar. 6, 2025

(30) Foreign Application Priority Data

Jun. 22, 2022 (KR) ........................ 10-2022-0076342
Sep. 26, 2022 (KR) ........................ 10-2022-0121891

(51) Int. Cl.
*A24F 40/05* (2020.01)
*A24F 40/42* (2020.01)
(Continued)

(52) U.S. Cl.
CPC .............. *A24F 40/05* (2020.01); *A24F 40/42* (2020.01); *A24F 40/50* (2020.01); *B06B 1/0215* (2013.01); *A24F 40/10* (2020.01); *B06B 2201/77* (2013.01)

(58) Field of Classification Search
CPC .......... A24F 40/05; A24F 40/10; A24F 40/30; A24F 40/50; A24B 15/167; B06B 1/0276; B06B 1/20; B06B 1/02; B06B 1/06
See application file for complete search history.

(56) References Cited

U.S. PATENT DOCUMENTS

2019/0052194 A1* 2/2019 Ninomiya .............. H10N 30/20
2022/0096269 A1 3/2022 Gliner et al.

FOREIGN PATENT DOCUMENTS

CN 108720081 A 11/2018
CN 215531615 U 1/2022
(Continued)

OTHER PUBLICATIONS

International Search Report for PCT/KR2023/008527 dated Sep. 18, 2023 [PCT/ISA/210].
(Continued)

*Primary Examiner* — Elizabeth L Mckane
(74) *Attorney, Agent, or Firm* — Foley & Lardner LLP

(57) ABSTRACT

A driving circuit of an electronic device includes a first power supply configured to generate a first signal for generating longitudinal vibration of a vibrator included in a cartridge connected to the electronic device, a second power supply configured to generate a second signal for generating transverse vibration of the vibrator, a signal synthesizer configured to generate a synthesized signal by synthesizing the first signal of the first power supply and the second signal of the second power supply, and a switch configured to open and close according to the synthesized signal.

8 Claims, 7 Drawing Sheets

(51) Int. Cl.

| | |
|---|---|
| ***A24F 40/50*** | (2020.01) |
| ***B06B 1/02*** | (2006.01) |
| *A24F 40/10* | (2020.01) |

(56) References Cited

FOREIGN PATENT DOCUMENTS

| | | | |
|---|---|---|---|
| JP | 2008-093345 | A | 4/2008 |
| JP | 2021-122804 | A | 8/2021 |
| KR | 20-1990-0006072 | Y1 | 6/1990 |
| WO | 02/040185 | A1 | 5/2002 |
| WO | 2018/138751 | A1 | 8/2018 |
| WO | 2022/124613 | A1 | 6/2022 |

OTHER PUBLICATIONS

Written Opinion for PCT/KR2023/008527 dated Sep. 18, 2023 [PCT/ISA/237].

Extended European Search Report for the corresponding EP Application No. 23801666.1 dated Apr. 21, 2026.

* cited by examiner

METHOD OF GENERATING AEROSOL USING ULTRASONIC VIBRATOR AND ELECTRONIC DEVICE FOR PERFORMING THE METHOD

TECHNICAL FIELD

Disclosed are a method of generating an aerosol using an ultrasonic vibrator and an electronic device for performing the method.

BACKGROUND ART

Cartridges connected to an aerosol generating device are generally of the same type, and optimized control is required for a liquid contained in this type of the cartridge. However, if necessary, a cartridge containing different types of liquid may be connected to an aerosol generating device to generate an aerosol. For this reason, it is required to control liquids differently depending on properties of the liquids.

The above description has been possessed or acquired by the inventor(s) in the course of conceiving the present disclosure and is not necessarily an art publicly known before the present application is filed.

DISCLOSURE OF THE INVENTION

Technical Goals

An embodiment may provide a driving circuit for driving a vibrator of an aerosol generating device.

An embodiment may provide an aerosol generating device for generating an aerosol.

Technical Solutions

According to an aspect, a driving circuit included in an electronic device includes a first power supply configured to generate a first signal for generating longitudinal vibration of a vibrator included in a cartridge connected to the electronic device, a second power supply configured to generate a second signal for generating transverse vibration of the vibrator, a signal synthesizer configured to generate a synthesized signal by synthesizing the first signal of the first power supply and the second signal of the second power supply, and a switch configured to open and close according to the synthesized signal.

The switch may be a field effect transistor (FET) switch, in which case the signal synthesizer may be connected to a gate terminal of the switch, a first terminal of the vibrator may be connected to a source terminal of the switch, and a second terminal of the vibrator may be connected to a drain terminal of the switch.

The driving circuit may further include a resistor connected to the source terminal of the switch and the gate terminal of the switch.

The driving circuit may further include an inductor having a first terminal connected to the drain terminal of the switch, and a third power supply connected to a second terminal of the inductor.

The first signal may have a frequency between 100 kilohertz (kHz) to 1000 kHz.

The second signal may have a frequency between 1 megahertz (MHz) to 10 MHz.

According to an aspect, an electronic cigarette may include the above-described driving circuit.

According to an aspect, an electronic device includes a cartridge unit including a vibrator configured to generate an aerosol by vibrating an aerosol generating material, and a body detachably connected to the cartridge unit. The body may include a driving circuit configured to operate the vibrator, and a controller configured to control an operation of the driving circuit. The driving circuit may include a first power supply configured to generate a first signal for generating longitudinal vibration of the vibrator, a second power supply configured to generate a second signal for generating transverse vibration of the vibrator, a signal synthesizer configured to generate a synthesized signal by synthesizing the first signal of the first power supply and the second signal of the second power supply, and a switch configured to be controlled by the synthesized signal.

Effects

According to an embodiment, a vibrator may operate according to a combination of two vibration modes.

According to an embodiment, a mist amount may be adjusted by a vibrator vibrating with various displacements according to the combination of the two vibration modes.

BEST MODE FOR CARRYING OUT THE INVENTION

Figure 1:
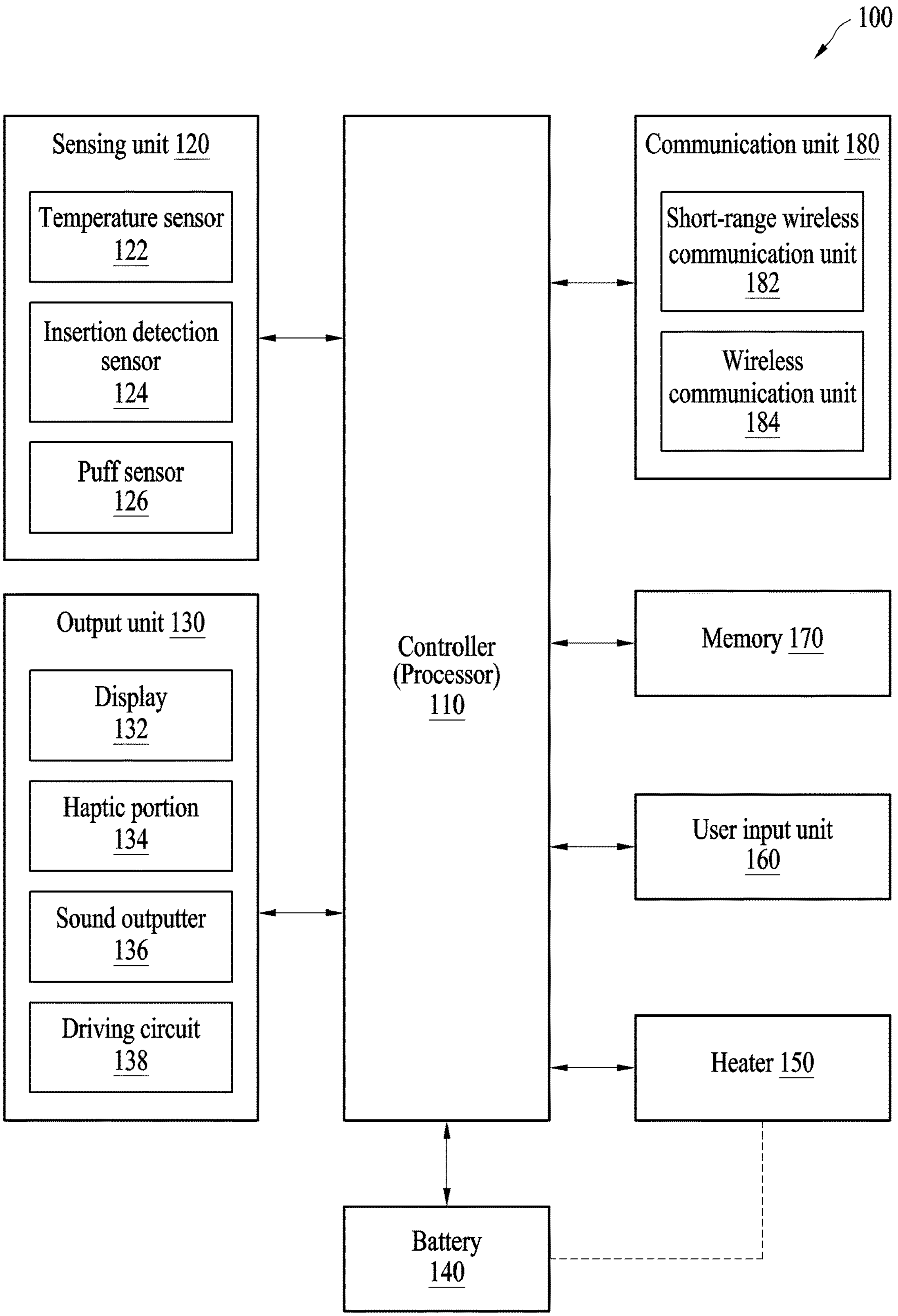
FIG. 1 is a block diagram of an aerosol generating device according to an embodiment.

The following detailed structural or functional description is provided as an example only and various alterations and modifications may be made to the examples. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a block diagram of an aerosol generating device according to an embodiment.

According to an embodiment, an aerosol generating device 100 of FIG. 1 may include a controller 110, a sensing unit 120, an output unit 130, a battery 140, an atomizer 150, a user input unit 160, a memory 170, and a communication unit 180. However, an internal structure of the aerosol generating device 100 is not limited to what is shown in FIG. 1. It is to be understood by one of ordinary skill in the art to which the disclosure pertains that some of the components shown in FIG. 1 may be omitted or new components may be added according to the design of the aerosol generating device 100.

The sensing unit 120 may sense a state of the aerosol generating device 100 or a state of an environment around the aerosol generating device 100, and transmit sensing information obtained through the sensing to the controller 110. Based on the sensing information, the controller 110 may control the aerosol generating device 100 to control operations of the atomizer 150, restrict smoking, determine whether an aerosol generating article (e.g., an aerosol generating article, a cartridge, etc.) is inserted, display a notification, and perform other functions.

The sensing unit 120 may include at least one of a temperature sensor 122, an insertion detection sensor 124, or a puff sensor 126. However, embodiments are not limited thereto.

The temperature sensor 122 may sense a temperature of the atomization unit 150 (or an aerosol generating material). The aerosol generating device 100 may include a separate temperature sensor for sensing a temperature of the atomizer 150, or the atomizer 150 itself may perform a function as a temperature sensor. Alternatively, the temperature sensor 122 may be arranged around the battery 140 to monitor a temperature of the battery 140.

The insertion detection sensor 124 may sense whether the aerosol generating article is inserted and/or removed. The insertion detection sensor 124 may include, for example, at least one of a film sensor, a pressure sensor, a light sensor, a resistive sensor, a capacitive sensor, an inductive sensor, or an infrared sensor, which may sense a signal change by the insertion and/or removal of the aerosol generating article.

The puff sensor 126 may sense a puff from a user based on various physical changes in an airflow path or airflow channel. For example, the puff sensor 126 may sense the puff from the user based on any one of a temperature change, a flow change, a voltage change, and a pressure change.

The sensing unit 120 may further include at least one of a temperature/humidity sensor, an atmospheric pressure sensor, a magnetic sensor, an acceleration sensor, a gyroscope sensor, a position sensor (e.g., a global positioning system (GPS)), a proximity sensor, or a red, green, blue (RGB) sensor (e.g., an illuminance sensor), in addition to the sensors 122 to 126 described above. A function of each sensor may be intuitively inferable from its name by one of ordinary skill in the art, and thus, a more detailed description thereof will be omitted here.

The output unit 130 may output information about the state of the aerosol generating device 100 and provide the information to the user. The output unit 130 may include at least one of a display 132, a haptic portion 134, or a sound outputter 136. However, embodiments are not limited thereto. When the display 132 and a touchpad are provided in a layered structure to form a touchscreen, the display 132 may be used as an input device in addition to an output device.

The display 132 may visually provide the information about the aerosol generating device 100 to the user. The information about the aerosol generating device 100 may include, for example, a charging/discharging state of the battery 140 of the aerosol generating device 100, a state of the atomizer 150, an insertion/removal state of the aerosol generating article, a limited usage state (e.g., an abnormal article detected) of the aerosol generating device 100, or the like, and the display 132 may externally output the information. The display 132 may be, for example, a liquid-crystal display panel (LCD), an organic light-emitting display panel (OLED), or the like. The display 132 may also be in the form of a light-emitting diode (LED) device.

The haptic portion 134 may provide the information about the aerosol generating device 100 to the user in a haptic way by converting an electrical signal into a mechanical stimulus or an electrical stimulus. The haptic portion 134 may include, for example, a motor, a piezoelectric element, or an electrical stimulation device.

The sound outputter 136 may provide the information about the aerosol generating device 100 to the user in an auditory way. For example, the sound outputter 136 may convert an electrical signal into a sound signal and externally output the sound signal.

The battery 140 may supply power to be used to operate the aerosol generating device 100. The battery 140 may supply power to operate the atomizer 150. In addition, the battery 140 may supply power required for operations of the other components (e.g., the sensing unit 120, the output unit 130, the user input unit 160, the memory 170, and the communication unit 180) included in the aerosol generating device 100. The battery 140 may be a rechargeable battery or a disposable battery. The battery 140 may be, for example, a lithium polymer (LiPoly) battery. However, embodiments are not limited thereto.

The atomizer 150 may receive power from the battery 140 to atomize the aerosol generating material. Although not shown in FIG. 1, the aerosol generating device 100 may further include a power conversion circuit (e.g., a direct current (DC)-to-DC (DC/DC) converter) that converts power of the battery 140 and supplies the power to the atomizer 150. In addition, when the aerosol generating device 100 generates an aerosol by an ultrasonic vibrating method, the aerosol generating device 100 may further include a DC-to-alternating current (AC) (DC/AC) converter that converts DC power of the battery 140 into AC power.

The controller 110, the sensing unit 120, the output unit 130, the user input unit 160, the memory 170, and the communication unit 180 may receive power from the battery 140 to perform functions. Although not shown in FIG. 1, the aerosol generating device 100 may further include a power conversion circuit, for example, a low dropout (LDO) circuit or a voltage regulator circuit, which converts power of the battery 140 and supplies the power to respective components.

In an embodiment, the atomizer 150 may include a vibrator that generates ultrasonic vibrations by an applied signal (e.g., power). For example, a material of the vibrator may include a piezoelectric ceramic. However, embodiments are not limited thereto. The vibrator may include a piezoelectric body. The piezoelectric body according to an embodiment may be a conversion element that may convert electrical energy into mechanical energy and may generate an ultrasonic vibration under the control of the controller 110. In an embodiment, when AC power is applied to a piezoelectric body that received poling treatment, the piezoelectric body may repeatedly expand and contract. As the piezoelectric body repeatedly expands and contracts, the vibrator may vibrate at a characteristic frequency. As a signal is applied to the vibrator, a short high-frequency vibration may be generated, and the generated vibration may break the aerosol generating material into small particles and atomize the aerosol generating material into an aerosol.

The user input unit 160 may receive information input from the user or may output information to the user. For example, the user input unit 160 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like. However, embodiments are not limited thereto. In addition, although not shown in FIG. 1, the aerosol generating device 100 may further include a connection interface such as a universal serial bus (USB) interface, and may be connected to another external device through the connection interface such as a USB interface to transmit and receive information or to charge the battery 140.

The memory 170, which is hardware for storing various pieces of data processed in the aerosol generating device 100, may store data processed by the controller 110 and data to be processed by the controller 110. The memory 170 may include at least one type of storage medium of a flash memory type memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 170 may store an operating time of the aerosol generating device 100, a maximum number of puffs, a current number of puffs, at least one temperature profile, data associated with a smoking pattern of the user, or the like.

The communication unit 180 may include at least one component for communicating with another electronic device. For example, the communication unit 180 may include a short-range wireless communication unit 182 and a wireless communication unit 184.

The short-range wireless communication unit 182 may include a Bluetooth communication unit, a Bluetooth low energy (BLE) communication unit, a near field communication unit, a wireless area network (WLAN) (wireless fidelity (Wi-Fi)) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 184 may include, for example, a cellular network communication unit, an Internet communication unit, a computer network (e.g., a local area network (LAN) or a wide-area network (WAN)) communication unit, or the like. However, embodiments are not limited thereto. The wireless communication unit 184 may use subscriber information (e.g., international mobile subscriber identity (IMSI)) to identify and authenticate the aerosol generating device 100 in a communication network.

The controller 110 may control the overall operation of the aerosol generating device 100. In an embodiment, the controller 110 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the present disclosure pertains that it may be implemented in other types of hardware.

The controller 110 may control an operation of the atomizer 150 by controlling the supply of power from the battery 140 to the atomizer 150. For example, the controller 110 may control the supply of power by controlling switching of a switching element of a driving circuit 138 positioned between the battery 140 and the atomizer 150.

The controller 110 may analyze a sensing result obtained by the sensing of the sensing unit 120 and control processes to be performed thereafter. For example, the controller 110 may control power to be supplied to the atomizer 150 to start or end an operation of the atomizer 150 based on the sensing result obtained by the sensing unit 120. In another example, the controller 110 may control an amount of power to be supplied to the atomizer 150 and a time for which the power is to be supplied, such that the atomizer 150 may vibrate at a predetermined frequency or maintain a desired vibration frequency based on the sensing result obtained by the sensing unit 120.

The controller 110 may control the output unit 130 based on the sensing result obtained by the sensing unit 120. For example, when a number of puffs counted through the puff sensor 126 reaches a preset number, the controller 110 may inform the user that the aerosol generating device 100 is to be ended soon, through at least one of the display 132, the haptic portion 134, or the sound outputter 136.

In an embodiment, the controller 110 may control a power supply time and/or a power supply amount for the atomizer 150 by controlling the driving circuit 138 according to a state of the aerosol generating article sensed by the sensing unit 120. For example, the controller 110 may control a vibration frequency of the vibrator of the atomizer 150 according to the type or a remaining amount of the aerosol generating article.

An embodiment may be implemented in the form of a recording medium including instructions executable by a computer, such as a program module executable by the computer. A computer-readable medium may be any available medium that may be accessed by a computer and includes all of a volatile medium, a non-volatile medium, a removable medium, and a non-removable medium. In addition, the computer-readable medium may include both a computer storage medium and a communication medium. The computer storage medium includes all of a volatile medium, a non-volatile medium, a removable medium, and a non-removable medium implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer medium.

Figure 2:
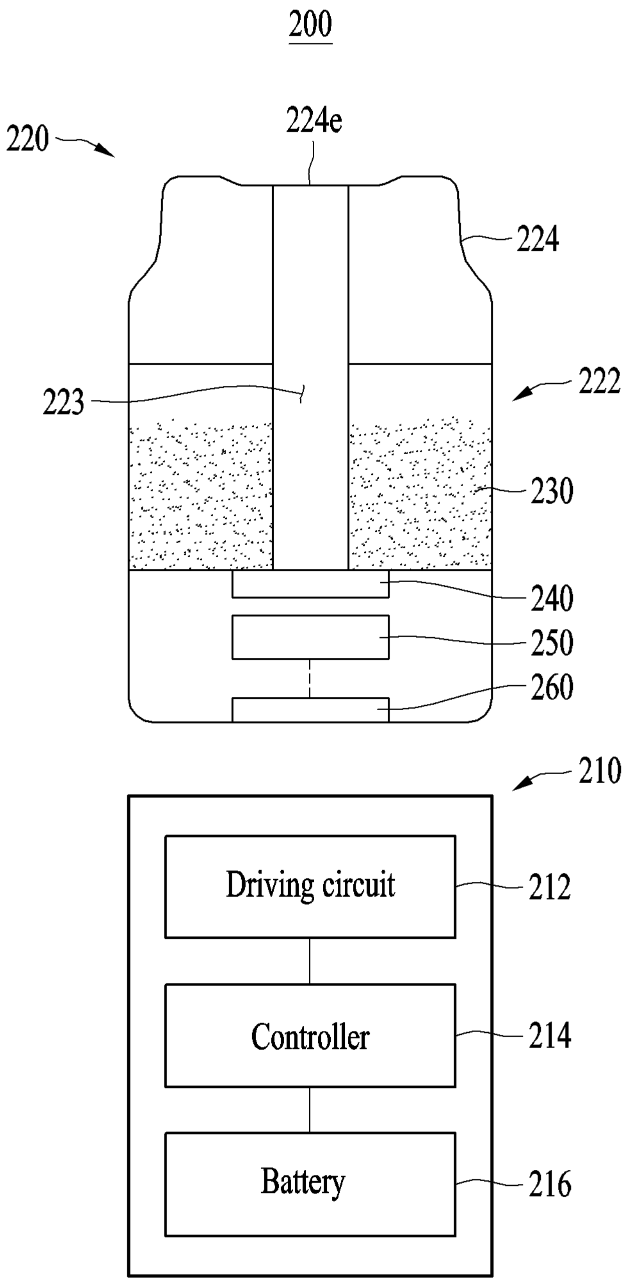
FIG. 2 is a schematic diagram of an aerosol generating device according to an embodiment.

FIG. 2 is a schematic diagram of an aerosol generating device according to an embodiment.

Referring to FIG. 2, an aerosol generating device 200 (e.g., the aerosol generating device 100 of FIG. 1) may include a cartridge 220 containing an aerosol generating material and a body 210 connected to the cartridge 220.

The cartridge 220 of the aerosol generating device 200 may be coupled to the body 210 while accommodating the aerosol generating material therein. For example, as at least a portion of the cartridge 220 is inserted into the body 210, the cartridge 220 and the body 210 may be coupled. In another example, as at least a portion of the body 210 is inserted into the cartridge 220, the cartridge 220 and the body 210 may be coupled.

The cartridge 220 and the body 210 may be coupled by at least one of a snap-fit method, a screw coupling method, a magnetic coupling method, or an interference fit method, but the coupling method of the cartridge 220 and the body 210 is not limited to the above examples.

According to an embodiment, the cartridge 220 may include a housing 222, a mouthpiece 224, a storage portion 230, a transfer portion 240, a vibrator 250, and an electrical terminal 260.

The housing 222 of the aerosol generating device 200 may form the overall appearance of the cartridge 220 together with the mouthpiece 224, and components for an operation of the cartridge 220 may be disposed inside the housing 222. For example, the housing 222 may be formed in a rectangular parallelepiped shape, but the shape of the housing 222 is not limited to the embodiment described above. According to an embodiment, the housing 222 may be formed in the shape of a polygonal column (e.g., a triangular column or a pentagonal column) or a cylindrical column.

The mouthpiece 224 of the aerosol generating device 200 may be disposed in one area of the housing 222 and may include an outlet **224*e* for discharging an aerosol generated from an aerosol generating material to the outside. For example, the mouthpiece 224 may be disposed in another area opposite to one area of the cartridge 220 coupled to the body 210, and the user may receive an aerosol from the cartridge 220 as the user brings the mouth into contact with the mouthpiece 224** and inhales the aerosol.

A pressure difference may occur between the outside of the cartridge 220 and the inside of the cartridge 220 due to a user's inhalation or puff operation, and an aerosol generated in the cartridge 220 may be discharged to the outside of the cartridge 220 through the outlet **224*e* due to the pressure difference between the inside and the outside of the cartridge 220. That is, the user may receive the aerosol discharged to the outside of the cartridge 220 through the outlet 224*e* as the user brings the mouth into contact with the mouthpiece 224** and inhales the aerosol.

The storage portion 230 of the aerosol generating device 200 may be positioned in an inner space of the housing 222 and may contain an aerosol generating material. In the present disclosure, the expression "the storage portion contains the aerosol generating material" means that the storage portion 230 performs a function of simply containing an aerosol generating material, such as the use of a container, and the storage portion 230 includes an element that impregnates (contains) an aerosol generating material, such as a sponge, cotton, cloth, or porous ceramic structure therein. In addition, the above expression may be used as the same meaning below.

The storage portion 230 may contain an aerosol generating material in one of a liquid state, a solid state, a gaseous state, and a gel state.

In an embodiment, the aerosol generating material may include a liquid composition. The liquid composition may be, for example, a liquid including a tobacco-containing material that includes a volatile tobacco flavor component, or may be a liquid including a non-tobacco material.

The liquid composition may include, for example, one of water, a solvent, ethanol, a plant extract, a fragrance, a flavoring agent, or a vitamin mixture, or a mixture these ingredients. The fragrance may include, for example, menthol, peppermint, spearmint oil, various fruit-flavored ingredients, and the like. However, embodiments are not limited thereto.

The flavoring agent may include ingredients that provide the user with a variety of flavors or scents. The vitamin mixture may be a mixture of at least one of vitamin A, vitamin B, vitamin C, or vitamin E. However, embodiments are not limited thereto. The liquid composition may also include an aerosol former such as glycerin and propylene glycol.

The liquid composition may include, for example, glycerin and propylene glycol in any weight ratio, to which a nicotine salt is added. The liquid composition may also include two or more types of nicotine salt. A nicotine salt may be formed by adding a suitable acid including an organic acid or an inorganic acid to nicotine. The nicotine may be either naturally generated nicotine or synthetic nicotine and may have a concentration of any appropriate weight relative to a total solution weight of the liquid composition.

The acid for forming the nicotine salt may be appropriately selected in consideration of an absorption rate of nicotine in the blood, an operating temperature of the aerosol generating device 200, a flavor or taste, solubility, and the like. For example, the acid for forming the nicotine salt may include a single acid selected from the group consisting of a benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, or malic acid, or a mixture of two or more acids selected from the above group. However, embodiments are not limited thereto.

The transfer portion 240 of the aerosol generating device 200 may absorb an aerosol generating material. For example, the aerosol generating material stored or contained in the storage portion 230 may be transferred from the storage portion 230 to the vibrator 250 through the transfer portion 240, and the vibrator 250 may generate an aerosol by atomizing the aerosol generating material of the transfer portion 240 or the aerosol generating material received from the transfer portion 240. In this case, the transfer portion 240 may include at least one of cotton fibers, ceramic fibers, glass fibers, or porous ceramics, but the transfer portion 240 is not limited to the embodiment described above.

According to an embodiment, the transfer portion 240 may be disposed adjacent to the storage portion 230 to receive a liquid aerosol generating material from the storage portion 230. For example, the aerosol generating material stored in the storage portion 230 may be discharged to the outside of the storage portion 230 through a liquid supply port formed in one area of the storage portion 230 facing the transfer portion 240, and the transfer portion 240 may absorb at least a portion of the aerosol generating material discharged from the storage portion 230, thereby absorbing the aerosol generating material from the storage portion 230.

According to an embodiment, the cartridge 220 may further include an absorber that is disposed to cover at least a portion of the vibrator 250 where an aerosol is generated, and transfers the aerosol generating material absorbed by the transfer portion 240 to the vibrator 250. The absorber may be made of a material capable of absorbing an aerosol generating material. For example, the absorber may include at least one material of SPL 30(H), SPL 50(H)V, NP 100(V8), SPL 60 (FC), and melamine. As the cartridge 220 further includes the absorber, the aerosol generating material may be absorbed not only in the transfer portion 240 but also in the absorber, so that the amount of aerosol generating material being absorbed may improve.

The vibrator 250 of the aerosol generating device 200 may be positioned inside the housing 222 and may generate an aerosol by converting a phase of the aerosol generating material stored in the cartridge 220. For example, the vibrator 250 may generate an aerosol by heating or vibrating an aerosol generating material.

In addition, as the absorber is disposed to cover at least a portion of the vibrator 250, the absorber may function as a physical barrier to prevent "spitting" of particles that are not sufficiently atomized during the aerosol generating process from being discharged directly to the outside of the aerosol generating device 200. Here, "spitting" may indicate that particles of an aerosol generating material having relatively large sizes as not sufficiently atomized are discharged to the outside of the cartridge 220. As the cartridge 220 further includes the absorber, the possibility of spitting may be reduced, and the smoking satisfaction of the user may improve.

In an embodiment, the absorber may be positioned between one surface of the vibrator 250 where an aerosol is generated and the transfer portion 240, and transfer the aerosol supplied to the transfer portion 240 to the vibrator 250. For example, one area of the absorber may contact one area of the transfer portion 240 facing a −z direction, and another area of the absorber may contact one area of the vibrator 250 facing a +z direction. That is, the absorber may be positioned on a top surface (e.g., in the +z direction) of the vibrator 250, and supply the aerosol generating material absorbed by the transfer portion 240 to the vibrator 250.

According to an embodiment, the vibrator 250 of the aerosol generating device 200 may change a phase of the aerosol generating material by using an ultrasonic vibrating method that atomizes the aerosol generating material with ultrasonic vibration. For example, the vibrator 250 may generate vibration with a short period, and the vibration generated from the vibrator 250 may be ultrasonic vibration. A frequency of the ultrasonic vibration may be in a range of about 100 kilohertz (kHz) to about 10 megahertz (MHz) (preferably, a range of about 100 kHz to 3.5 MHz). However, embodiments are not limited thereto. As the vibrator generates ultrasonic vibration of the frequency band described above, the vibrator may vibrate in a longitudinal direction (e.g., a z-axis direction) of the cartridge 220 or the housing 222. However, embodiments are not limited to the direction in which the vibrator vibrates, and the direction in which the vibrator vibrates may be changed to various directions (e.g., one of an x-axis direction, a y-axis direction, and the z-axis direction or a combination thereof). The aerosol generating material supplied from the storage portion 230 to the vibrator 250 by the vibration with the short period generated from the vibrator 250 may be vaporized and/or change into particles to be atomized into an aerosol.

For example, the vibrator 250 may include a piezoelectric ceramic, and the piezoelectric ceramic may be a functional material capable of converting power and a mechanical force into each other by generating power (a voltage) by a physical force (a pressure) and generating vibration (a mechanical force) when the power is applied thereto. That is, as power is applied to the vibrator 250, the vibration with the short period (the physical force) may be generated, and the generated vibration may break the aerosol generating material into small particles and atomize the aerosol generating material into an aerosol.

The vibrator 250 may be electrically connected to other components of the aerosol generating device 200 through the electrical terminal 260. The electrical terminal 260 may be positioned on one surface of the cartridge 220. For example, the electrical terminal 260 may be positioned on a coupling surface of the cartridge 220 where the cartridge 220 is coupled to the body 210 of the aerosol generating device 20. The electrical terminal 260 may be positioned on one surface of the housing 222 opposite the mouthpiece 224.

According to an embodiment, the vibrator 250 may be electrically connected to at least one of a driving circuit 212, a controller 214, or a battery 216 of the body 210 through the electrical terminal 260 positioned inside the housing 222 of the cartridge 220.

For example, the vibrator 250 may be electrically connected to the electrical terminal 260 positioned inside the cartridge 220 through a first conductor, and the electrical terminal 260 may be electrically connected to the driving circuit 212 of the body 210 through a second conductor. That is, the vibrator 250 may be electrically connected to components of the body 210 through the electrical terminal 260.

The vibrator 250 may generate ultrasonic vibration by receiving power from the battery 216 of the body 210 through the electrical terminal 260. In addition, the vibrator 250 may be electrically connected to the controller 214 of the body 210 through the electrical terminal 260, and the controller 214 may control the operation of the vibrator 250 through the driving circuit 212.

For example, the electrical terminal 260 may include at least one of a pogo pin, a wire, a cable, a printed circuit board (PCB), a flexible printed circuit board (FPCB), or a C-clip. However, the electrical terminal 260 is not limited to the above examples.

In an embodiment, the vibrator 250 may be implemented as a mesh-shaped or plate-shaped vibration accommodation portion that performs both a function of absorbing an aerosol generating material and maintaining the aerosol generating material in an optimal state to be converted into an aerosol and a function of transferring vibration to the aerosol generating material to generate an aerosol, without using the separate transfer portion 240.

The aerosol generated by the vibrator 250 may be discharged to the outside of the cartridge 220 through an airflow path 223 and supplied to the user.

According to an embodiment, the airflow path 223 may be positioned inside the cartridge 220 and may be connected to the vibrator 250 and the outlet 224*e* of the mouthpiece 224. Accordingly, the aerosol generated by the vibrator 250 may flow along the airflow path 223 and may be discharged to the outside of the cartridge 220 or the aerosol generating device 200 through the outlet 224*e*. The user may receive the aerosol as the user brings the mouth into contact with the mouthpiece 224 and inhales the aerosol discharged from the outlet 224*e*.

Although not shown in the drawings, the airflow path 223 may include at least one inlet through which air outside the cartridge 220 is introduced into the cartridge 220. The inlet may be positioned on at least a portion of the housing 222 of the cartridge 220. For example, the inlet may be positioned on the coupling surface (e.g., a bottom surface) of the cartridge 220 where the cartridge 220 and the body 210 are coupled.

Since at least one gap may be formed in a portion where the cartridge 220 and the body 210 are coupled, external air may be introduced through the gap between the cartridge 220 and the body 210 and move into the cartridge 220 through the inlet.

The airflow path 223 may be connected from the inlet to a space where an aerosol is generated by the vibrator 250, and may be connected from the corresponding space to the outlet 224*e*.

Accordingly, the air introduced through the inlet may be transferred to the vibrator 250, and the transferred air may move to the outlet 224*e* together with the aerosol generated by the vibrator 250, thereby circulating the air inside the cartridge 220.

According to an embodiment, at least a portion of the airflow path 223 may be disposed to be surrounded by the storage portion 230 in the housing 222. In another example, at least a portion of the airflow path 223 may be disposed between an inner wall of the housing 222 and an outer wall of the storage portion 230. The arrangement structure of the airflow path 223 is not limited to the above examples, and the airflow path 223 may be arranged in various structures to circulate the airflow between the inlet, the vibrator 250, and the outlet 224*e*.

According to an embodiment, the body 210 may include the driving circuit 212, the controller 214, and the battery 216 therein, and one end portion of the body 210 may be connected to one end portion of the cartridge 220. For example, the body 210 may be coupled to the bottom surface or the coupling surface of the cartridge 220.

When the vibrator 250 of the cartridge 220 is electrically connected to the driving circuit 212 through the electrical terminal 260, the driving circuit 212 may supply power to the vibrator 250. For example, a magnitude of power supplied to the vibrator 250 may be determined by the controller 214. A vibration frequency of the vibrator 250 or the like may be controlled by the magnitude of the power. The driving circuit 212 according to an embodiment may be in the form of a Class-E power amplifier circuit, a half bridge circuit, or a full bridge circuit. However, embodiments are not limited to the described embodiment.

The controller 214 may control the overall operation of the aerosol generating device 200. For example, the controller 214 may control the amount of aerosol generated by the vibrator 250 by controlling power supplied from the battery 216 to the vibrator 250. For example, the controller 214 may control power supplied to the vibrator 250 so that the vibrator 250 may vibrate at a predetermined frequency.

The controller 214 may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the controller 214 may be implemented in other types of hardware.

The controller 214 analyzes a sensing result obtained by at least one sensor included in the aerosol generating device 200 and controls subsequent processes to be performed. For example, the controller 214 may control power to be supplied to the vibrator 250 to start or end an operation of the vibrator 250 based on the sensing result obtained by the at least one sensor. In addition, the controller 214 may control an amount of power to be supplied to the vibrator 250 and a time for which the power is to be supplied, such that the vibrator 250 may generate an appropriate amount of aerosol based on the sensing result obtained by the at least one sensor.

The battery 216 may supply power to be used to operate the aerosol generating device 200. For example, when the body 210 is electrically coupled to the cartridge 220, the battery 216 may supply power to the vibrator 250.

The battery 216 may supply power required for operations of the other hardware components (e.g., a sensor, a user interface, a memory, and the controller 214) included in the aerosol generating device 200. The battery 216 may be a rechargeable battery or a disposable battery.

For example, the battery 216 may include a nickel-based battery (e.g., a nickel-metal hydride battery or a nickel-cadmium battery) or a lithium-based battery (e.g., a lithium-cobalt battery, a lithium-phosphate battery, a lithium-titanate battery, a lithium-ion battery, or a lithium-polymer battery).

In an embodiment, a shape of a cross-section of the aerosol generating device 200 in a direction transverse to the longitudinal direction of the cartridge 220 and/or the body 210 may be circular, elliptical, square, rectangular, or various polygonal shapes. However, the shape of the cross-section of the cartridge 220 and/or the body 210 is not limited to the above shapes or is not limited to a shape that linearly extends when the aerosol generating device 200 extends in the longitudinal direction.

In an embodiment, the shape of the cross-section of the aerosol generating device 200 may extend long to be curved in a streamlined shape or bent in a particular area at a predetermined angle to make it easier for the user to hold by hand, and the shape of the cross-section of the aerosol generating device 200 may change along the longitudinal direction.

Figure 3:
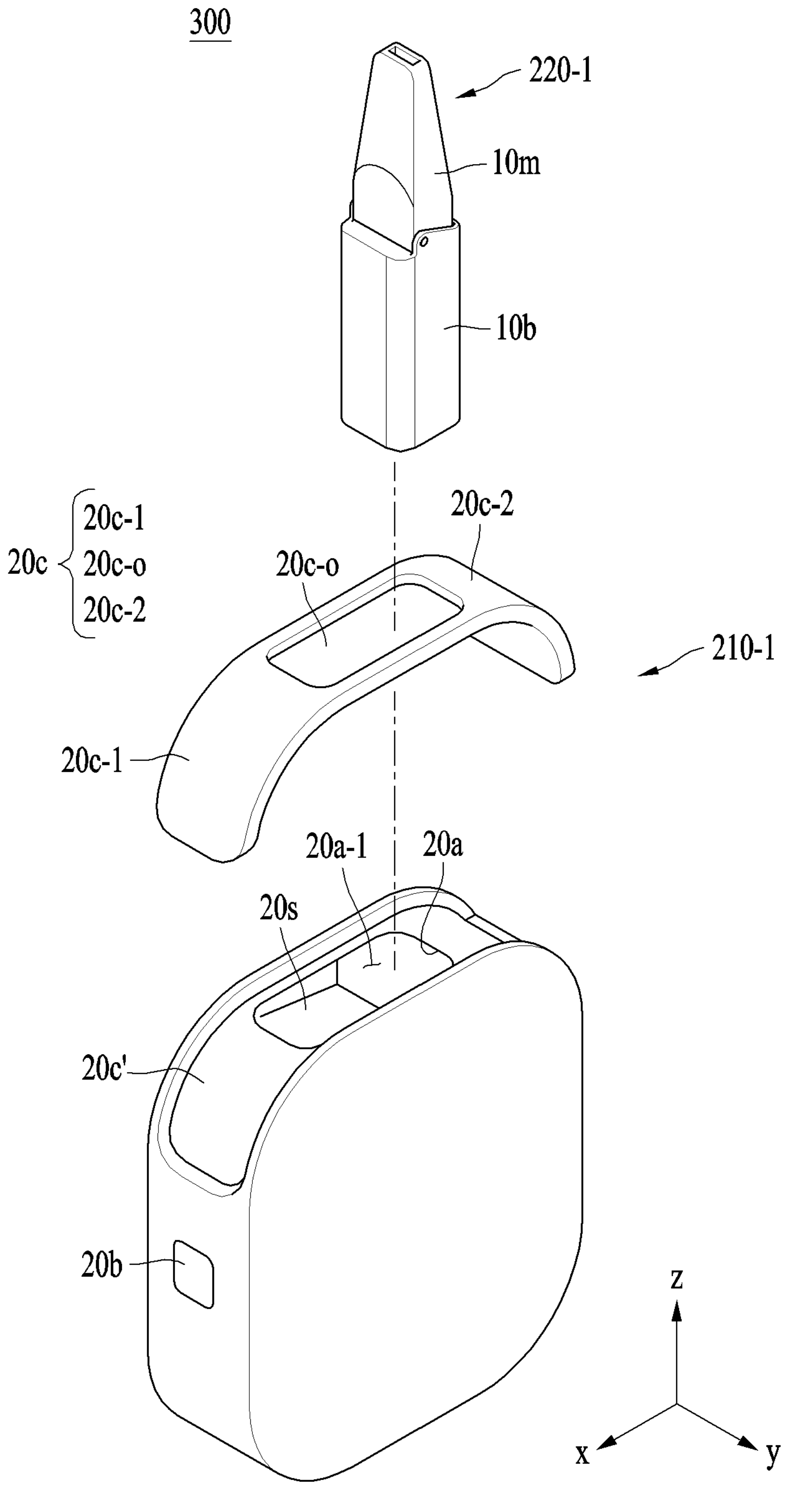
FIG. 3 is a perspective view illustrating that a cartridge and a body of an aerosol generating device are separated according to an embodiment.
Figure 4:
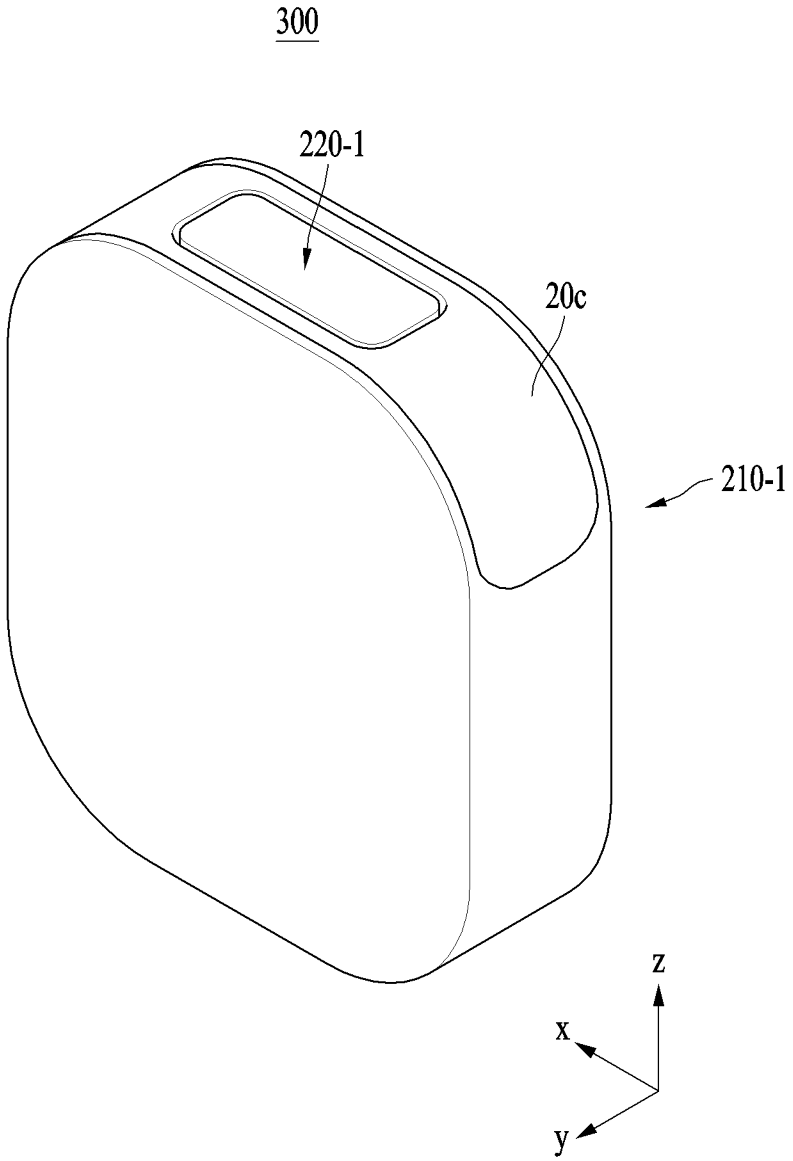
FIG. 4 is a perspective view illustrating that a cartridge and a body of an aerosol generating device are coupled according to an embodiment.

FIG. 3 is a perspective view illustrating that a cartridge and a body portion of an aerosol generating device are separated according to an embodiment, and FIG. 4 is a perspective view illustrating that a cartridge and a body portion of an aerosol generating device are coupled according to an embodiment.

An aerosol generating device 300 according to an embodiment shown in FIGS. 3 and 4 may be a modified example of the aerosol generating device 200 shown in FIG. 2 (or the aerosol generating device 100 of FIG. 1), and a cartridge 220-1 and a body 210-1 according to the embodiment shown in FIGS. 3 and 4 may be modified examples of the cartridge 220 and the body 210 shown in FIG. 2, respectively, and therefore, the repeated description will be omitted below.

Referring to FIGS. 3 and 4, the cartridge 220-1 may be detachably coupled to the body 210-1. For example, as at least a portion of the cartridge 220-1 is inserted into the body 210-1, the cartridge 220-1 may be coupled to the body 210-1.

The cartridge 220-1 may include a mouthpiece 10*m* that may move between an open position and a closed position. For example, the mouthpiece 10*m* may be opened and closed by rotating between the open position and the closed position.

A body portion 10*b* of the cartridge 220-1 may be coupled to the mouthpiece 10*m* through a rotation shaft. In an example, the mouthpiece 10*m* may be positioned at the open position. The open state of the mouthpiece 10*m* may refer to a state where the mouthpiece 10*m* is stretched in the longitudinal direction of the cartridge 220-1 to make it easier for the user to bring the mouth into contact with the mouthpiece 10*m*. Here, the longitudinal direction may refer to a direction in which the cartridge 220-1 extends the longest among several directions. In another example, the mouthpiece 10*m* may be positioned at the closed position. The closed state of the mouthpiece 10*m* may refer to a state where the mouthpiece 10*m* is folded in a direction transverse to the longitudinal direction of the cartridge 220-1 so that the mouthpiece 10*m* is accommodated in the body 210-1 of the aerosol generating device 300.

The cartridge 220-1 may include the body portion 10*b* including various components required to generate an aerosol and discharge the generated aerosol. For example, the body portion 10*b* may include at least a portion of each of a storage portion, a vibrator, and an airflow path.

The body 210-1 may include a coupling portion 20*a* to which the cartridge 220-1 is able to be coupled. For example, the body 210-1 may include an accommodation groove 20*a*-1 in which at least a portion of the cartridge 220-1 may be accommodated. The body portion 10*b* of the cartridge 220-1 may be inserted into the accommodation groove 20*a*-1. For example, the body portion 10*b* of the cartridge 220-1 may have a substantially rectangular column shape, and corners of the rectangular column may be chamfered or rounded. However, the shape of the body portion 10*b* of the cartridge 220-1 is not limited to the above examples and may be a cylindrical or polygonal column shape.

As described above with reference to FIG. 2, the cartridge 220-1 and the body 210-1 may be coupled by at least one of a snap-fit method, a screw coupling method, a magnetic coupling method, or an interference fit method. For example, the cartridge 220-1 may include a first magnetic body and the body 210-1 may include a second magnetic body so that the cartridge 220-1 and the body 210-1 may be coupled by a magnetic force. However, the intensity of the first magnetic material and the second magnetic material may be designed considering the ease of attachment and detachment of the cartridge 220-1 and the body 210-1 and/or operational stability of the aerosol generating device 300.

The body 210-1 may include a button 20*b*. The button 20*b* may be positioned on one surface of the body 210-1. For example, the button 20*b* may be positioned on one surface of the body 210-1 corresponding to one end 20*c*-1 of a cover 20*c*. The user may control the operation of the aerosol generating device 300 using the button 20*b* when using the aerosol generating device 300.

The body 210-1 may further include an accommodation portion 20*s* capable of accommodating the mouthpiece 10*m* of the cartridge 220-1 when the mouthpiece 10*m* moves to the closed position. The accommodation portion 20*s* may be positioned on one surface of the body 210-1 and may have a shape or size corresponding to that of the mouthpiece 10*m*.

As shown in FIG. 4, the mouthpiece 10*m*, which has moved to the closed position, may minimize a portion of the aerosol generating device 300 protruding outside, that is, a portion protruding outside from an outer surface of the body 210-1 at the closed position, thereby improving portability.

In an embodiment, the body 210-1 may further include the cover 20*c* coupled to a portion of the body 210-1. The cover 20*c* may be coupled to at least one surface of the body 210-1. For example, the cover 20*c* may be coupled to one side of the body 210-1 where the coupling portion 20*a* is positioned. Also, the cover 20*c* may be coupled to one side of the body 210-1 where the accommodation portion 20*s* is positioned.

The cover 20*c* may include an opening 20*c-o*. The cover 20*c* may include the opening 20*c-o* having a size corresponding to that of the mouthpiece 10*m*. For example, the opening 20*c-o* may have a predetermined length and width. Here, the width of the opening 20*c-o* may be smaller than or equal to that of a body of the cartridge 220-1 and may be larger than or equal to that of the mouthpiece 10*m*. A length of the opening 20*c-o* may be longer than or equal to that of the mouthpiece 10*m*.

The cover 20*c* may extend from one end 20*c*-1 to the other end 20*c*-2 to be disposed on a seating portion 20*c*' of the body 210-1. For example, the seating portion 20*c*' may have a size and shape corresponding to those of the cover 20*c*. The seating portion 20*c*' may be in the form of a recess with a predetermined depth that extends in both directions from an inlet side of the coupling portion 20*a* and the accommodation portion 20*s* so that the cover 20*c* is able to be coupled thereto.

When the cartridge 220-1 is coupled to the body 210-1, the cover 20*c* may be coupled to the body 210-1 after the cartridge 220-1 is coupled to the body 210-1. The cover 20*c* may be coupled to one side of the body 210-1 by at least one of a snap-fit method, an interference fit method, or a magnetic coupling method. However, embodiments are not limited thereto.

Since the cover 20*c* includes the opening 20*c-o* through which the mouthpiece 10*m* may pass, it is possible to protect the cartridge 220-1 without interfering the opening and closing motion of the mouthpiece 10*m* in a state where the cartridge 220-1 is coupled to the body 210-1, and maintain the coupling of the cartridge 220-1 and the body 210-1.

FIG. 4 shows the aerosol generating device 300 in which both the cartridge 220-1 and the cover 20*c* are coupled to the body 210-1 and the mouthpiece 10*m* is positioned at the closed position. As shown in FIG. 4, as the body 210-1 includes the accommodation portion 20*s* having a size and shape corresponding to those of the mouthpiece 10*m*, and the seating portion 20*c*' having a size and shape corresponding to those of the cover 20*c*, and the cover 20*c* includes the opening 20*c-o* having a size and shape corresponding to those of the mouthpiece 10*m*, the overall finish of the aerosol generating device 300 is solid and smooth.

In order to separate the cartridge 220-1 from the body 210-1, the cover 20*c* may be first separated from the body 210-1 and then the cartridge 220-1 may be separated from the body 210-1. As described above, the cover 20*c* and the cartridge 220-1 may be sequentially separated from the body 210-1 or sequentially coupled to the body 210-1.

Figure 5:
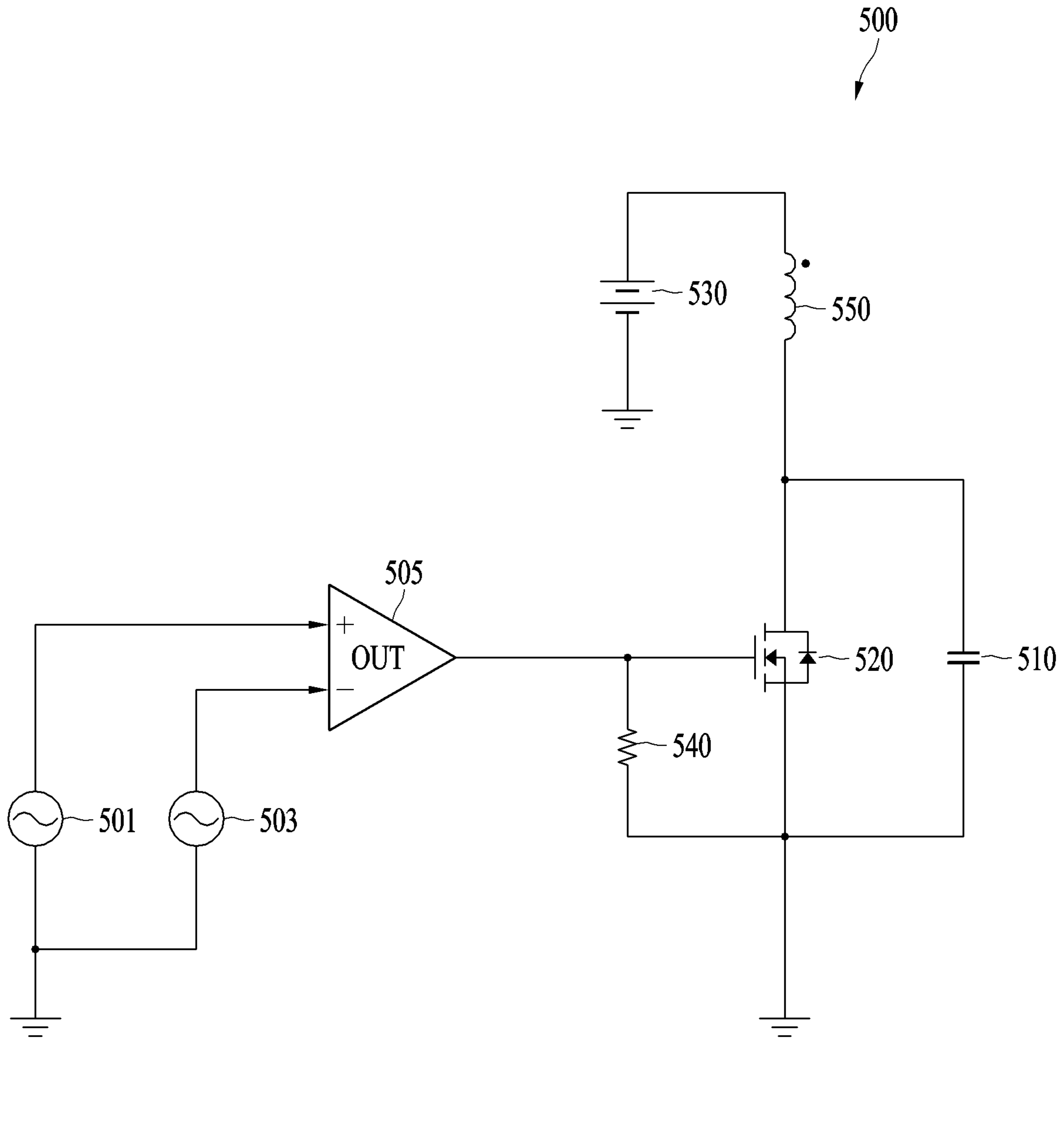
FIG. 5 illustrates a driving circuit according to an embodiment.

FIG. 5 illustrates a driving circuit according to an embodiment.

According to an embodiment, a driving circuit 500 (e.g., the driving circuit 138 of FIG. 1 or the driving circuit 212 of FIG. 2) may be included in an electronic device (e.g., the aerosol generating device 100 of FIG. 1, the aerosol generating device 200 of FIG. 2, or the aerosol generating device 300 of FIG. 3).

According to an embodiment, the driving circuit 500 may include a first power supply 501 which generates a first signal for generating longitudinal vibration of a vibrator 510 (e.g., the atomizer 150 of FIG. 1 or the vibrator 250 of FIG. 2) included in a cartridge connected to the electronic device, a second power supply 503 which generates a second signal for generating transverse vibration of the vibrator 510, a signal synthesizer 505 which generates a synthesized signal by synthesizing the first signal of the first power supply 501 and the second signal of the second power supply 503, and a switch 520 that is controlled by the synthesized signal.

According to an embodiment, the vibrator 510 may be included in a cartridge unit. When the cartridge unit is mechanically coupled to a body, the vibrator 510 may be electrically connected to the driving circuit 500 as shown in FIG. 5. In this case, the controller 214 may recognize that the vibrator 510 is coupled and may supply power to the vibrator 510 through the driving circuit 500.

According to an embodiment, the switch 520 may be a switch based on a field effect transistor (FET). The signal synthesizer 505 may be connected to a gate terminal of the switch 520. A first terminal of the vibrator 510 may be connected to a source terminal of the switch 520, and a second terminal of the vibrator 510 may be connected to a drain terminal of the switch 520.

According to an embodiment, a resistor 540 may be connected to the source terminal of the switch 520 and the gate terminal of the switch 520, respectively.

According to an embodiment, an inductor 550 may be connected to the drain terminal of the switch 520. Specifically, a first terminal of the inductor 550 may be connected to the drain terminal of the switch 520. A third power supply 530 may be connected to a second terminal of the inductor 550. The third power supply 530 may provide a DC voltage to the drain terminal of the switch 520. For example, the DC voltage may be less than or equal to 15 V (e.g., 10 V), but is not limited thereto.

According to an embodiment, the driving circuit 500 may be not only a driving circuit including a Class-E amplifying circuit including the switch 520 as described above with reference to FIG. 5 but also a driving circuit including a full bridge circuit or a driving circuit including a half bridge circuit. However, embodiments are not limited thereto.

Figure 6:
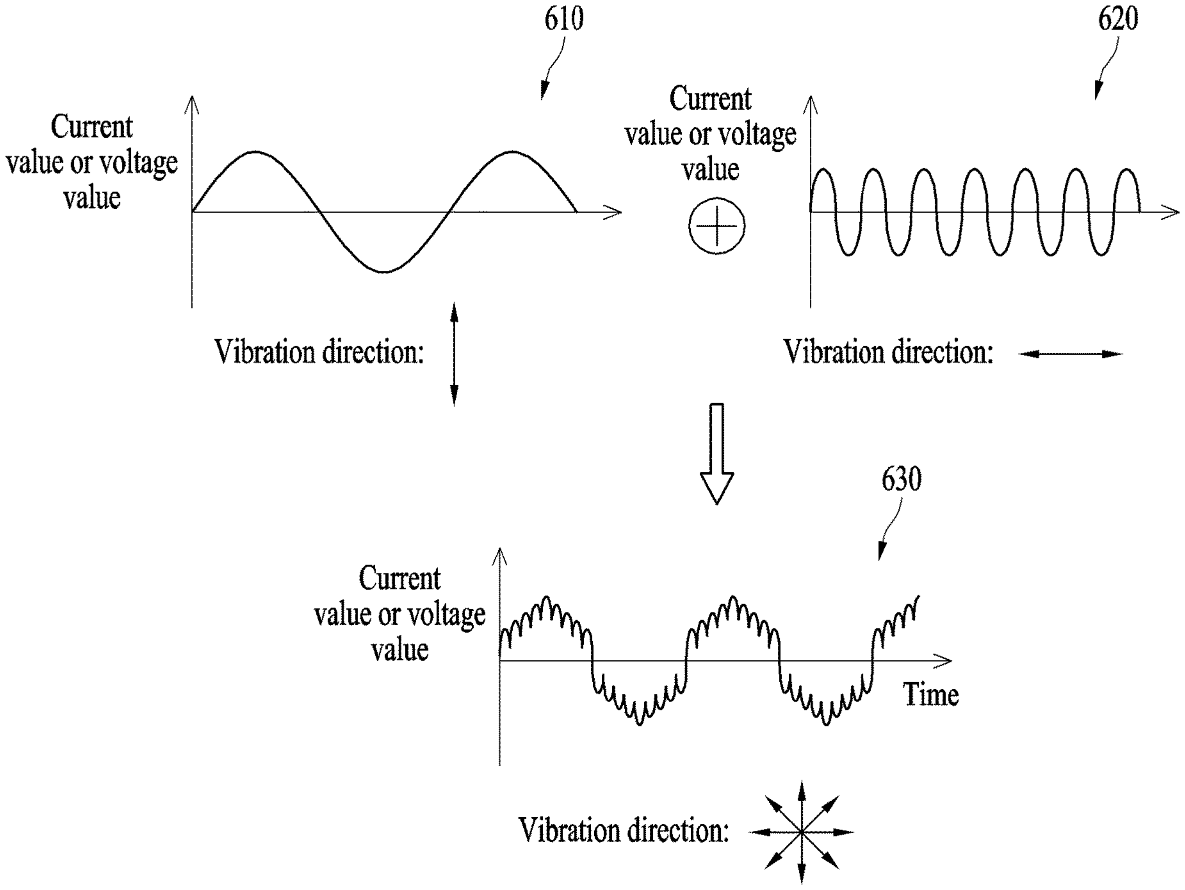
FIG. 6 illustrates waveforms of signal synthesis according to an embodiment.

FIG. 6 illustrates waveforms of signal synthesis according to an embodiment.

According to an embodiment, a frequency of a first signal 610 generated by a first power supply (e.g., the first power supply 501 of FIG. 5) may be a frequency in a range of 100 kHz to 1 MHz, but is not limited thereto. For example, the frequency of the first signal 610 is in a range capable of generating longitudinal vibration of a vibrator when supplied to the vibrator (e.g., the vibrator 510 of FIG. 5) alone. The frequency of the first signal 610 may be a frequency when impedance across both terminals of the vibrator vibrating in the longitudinal direction according to the first signal 610 alone is the lowest.

According to an embodiment, a frequency of a second signal 620 generated by a second power supply (e.g., the second power supply 503 of FIG. 5) may be a frequency in a range of 1 MHz to 10 MHz, but is not limited thereto. For example, the frequency of the second signal 620 is in a range capable of generating transverse vibration of the vibrator when supplied to the vibrator alone. The frequency of the second signal 620 may be a frequency when impedance across both terminals of the vibrator vibrating in the transverse direction according to the second signal 620 alone is the lowest. Specifically, the frequency of the second signal 620 may be in a range of 2.5 MHz to 3.5 MHz.

According to an embodiment, a signal synthesizer (e.g., the signal synthesizer 505 of FIG. 5) may synthesize the first signal 610 and the second signal 620. For example, the signal synthesizer may generate a synthesized signal 630 having a harmonic of which frequency is a integer multiple of a frequency of the first signal 610 or the second signal 620.

According to an embodiment, when the synthesized signal 630 obtained by synthesizing the first signal 610 and the second signal 620 by the signal synthesizer is supplied to the vibrator, unlike a case where each of the first signal 610 and the second signal 620 is supplied alone, the vibrator may vibrate in various directions (a synthesized direction of the longitudinal direction and the transverse direction) including the longitudinal direction and the transverse direction. In addition, when the synthesized signal 630 is supplied to the vibrator, the vibration amplitude (i.e., vibration intensity) of the vibrator may be greater than that in a case where the first signal 610 or the second signal 620 is supplied alone.

Figure 7:
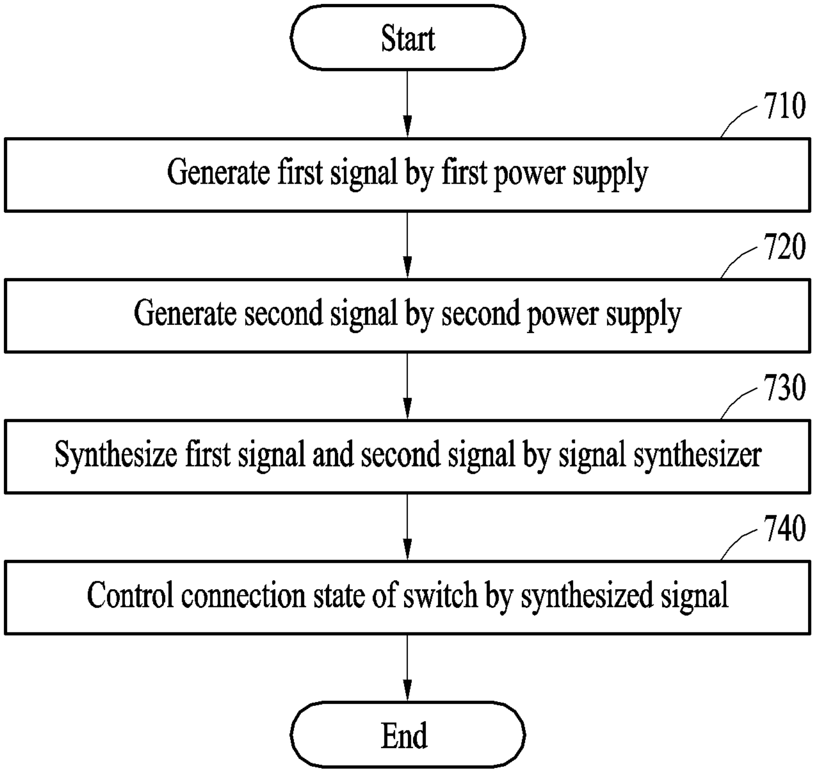
FIG. 7 is a flowchart illustrating a method of generating an aerosol according to an embodiment.

FIG. 7 is a flowchart illustrating a method of generating an aerosol according to an embodiment.

In operation 710, a first signal is generated by a first power supply. The first signal may generate longitudinal vibration of a vibrator. According to an embodiment, an electronic device may adjust the first signal generated by the first power supply to achieve a desired atomization amount. Specifically, at least one of a magnitude (e.g., a current value or a voltage value), frequency, or phase of the first signal may be adjusted.

In operation 720, a second signal is generated by a second power supply. The second signal may generate transverse vibration of the vibrator. According to an embodiment, the electronic device may adjust the second signal generated by the second power supply to achieve a desired atomization amount. Specifically, at least one of a magnitude (e.g., a current value or a voltage value), frequency, or phase of the second signal may be adjusted.

In operation 730, the first signal and the second signal are synthesized by a signal synthesizer.

According to an embodiment, a method of synthesizing the first signal and the second signal may be adjusted to achieve a desired atomization amount. For example, when an amount of atomization generated by supplying a signal to the vibrator by test signal synthesis of a driving circuit does not reach the desired atomization amount, the electronic device may change the synthesis method of the signal synthesizer.

According to an embodiment, the vibrator included in a cartridge unit has a natural frequency determined by a physical property of the vibrator. As the frequency of the signal supplied to the vibrator is similar to the natural frequency of the vibrator, stronger resonance occurs. Impedance between both terminals of the vibrator may be measured in order to make strong resonance occur by supplying the synthesized signal, which is synthesized by the signal synthesizer, to the vibrator. The electronic device may measure the impedance between both terminals of the vibrator while changing the synthesis method of the signal synthesizer, and may control the signal synthesizer according to a synthesis method having the lowest measured impedance among the synthesis methods.

In operation 740, a connection state of a switch is controlled by the synthesized signal. The switch (e.g., the switch 520 of FIG. 5) may be a FET-based switch.

The embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and/or equivalents of the claims are within the scope of the following claims.

The invention claimed is:

1. A driving circuit included in an electronic device, the driving circuit comprising:
- a first power supply configured to generate a first signal for generating longitudinal vibration of a vibrator included in a cartridge connected to the electronic device;
- a second power supply configured to generate a second signal for generating transverse vibration of the vibrator;
- a signal synthesizer configured to generate a synthesized signal by synthesizing the first signal of the first power supply and the second signal of the second power supply; and
- a switch configured to be controlled by the synthesized signal.

2. The driving circuit of claim 1, wherein
- the switch is a field effect transistor (FET) switch,
- the signal synthesizer is connected to a gate terminal of the switch,
- a first terminal of the vibrator is connected to a source terminal of the switch, and
- a second terminal of the vibrator is connected to a drain terminal of the switch.

3. The driving circuit of claim 2, further comprising:
- a resistor connected to the source terminal of the switch and the gate terminal of the switch.

4. The driving circuit of claim 2, further comprising:
- an inductor having a first terminal connected to the drain terminal of the switch; and
- a third power supply connected to a second terminal of the inductor.

5. The driving circuit of claim 1, wherein the first signal has a frequency between 100 kilohertz (kHz) to 1000 kHz.

6. The driving circuit of claim 1, wherein the second signal has a frequency between 1 megahertz (MHz) to 10 MHz.

7. An electronic cigarette including the driving circuit of claim 1.

8. An electronic device comprising:
- a cartridge unit comprising a vibrator configured to generate an aerosol by vibrating an aerosol generating material; and
- a body detachably connected to the cartridge unit, and comprising:
  - a driving circuit configured to operate the vibrator; and
  - a controller configured to control an operation of the driving circuit,
- wherein the driving circuit comprises:
  - a first power supply configured to generate a first signal for generating longitudinal vibration of the vibrator;
  - a second power supply configured to generate a second signal for generating transverse vibration of the vibrator;
  - a signal synthesizer configured to generate a synthesized signal by synthesizing the first signal of the first power supply and the second signal of the second power supply; and a switch configured to be controlled by the synthesized signal.

* * * * *